United States Patent
Nakanishi et al.

(10) Patent No.: US 9,817,778 B2
(45) Date of Patent: Nov. 14, 2017

(54) ELECTRONIC DEVICE AND METHOD FOR COMMUNICATING WITH USB DEVICE

(71) Applicant: KABUSHIKI KAISHA TOSHIBA, Minato-ku, Tokyo (JP)

(72) Inventors: Wataru Nakanishi, Tokyo (JP); Yoshihisa Suzuki, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 169 days.

(21) Appl. No.: 14/878,259

(22) Filed: Oct. 8, 2015

(65) Prior Publication Data
US 2016/0179722 A1   Jun. 23, 2016

Related U.S. Application Data

(60) Provisional application No. 62/094,753, filed on Dec. 19, 2014.

(51) Int. Cl.
G06F 13/00   (2006.01)
G06F 13/362   (2006.01)
G06F 13/40   (2006.01)
G06F 13/42   (2006.01)

(52) U.S. Cl.
CPC ........ G06F 13/362 (2013.01); G06F 13/4068 (2013.01); G06F 13/4282 (2013.01)

(58) Field of Classification Search
None
See application file for complete search history.

(56) References Cited

U.S. PATENT DOCUMENTS 7,114,105 B2 * 9/2006 Rao ................. G06F 11/004
                                                714/38.1
8,065,462 B2 * 11/2011 Chan ................. H04L 12/66
                                                455/466

FOREIGN PATENT DOCUMENTS

JP   2010-152775 A   7/2010
JP   2014-059913 A   4/2014

OTHER PUBLICATIONS

USB 3.0, Universal Serial Bus 3.0 Specification, 2008, pp. 7-35~7-37.*

* cited by examiner

*Primary Examiner* — Cheng-Yuan Tseng
(74) *Attorney, Agent, or Firm* — Foley & Lardner LLP

(57) ABSTRACT

According to one embodiment, an electronic device includes a USB host controller, and a wireless transceiver connected to the USB host controller through a USB bus. When it is detected that a USB device is present in a communication range of the wireless transceiver, a load is connected to the USB bus. When the USB host controller enters a compliance mode after connecting the load to the USB bus, the electronic device executes a process for directing the USB host controller to issue a Warm Reset for the USB host controller to exit the compliance mode.

13 Claims, 5 Drawing Sheets

ELECTRONIC DEVICE AND METHOD FOR COMMUNICATING WITH USB DEVICE

CROSS-REFERENCE TO RELATED APPLICATIONS

This application claims the benefit of U.S. Provisional Application No. 62/094,753, filed Dec. 19, 2014, the entire contents of which are incorporated herein by reference.

FIELD

Embodiments described herein relate generally to a technique for communicating without a cable with external peripheral devices.

BACKGROUND

In recent years, various electronic devices such as a personal computer (PC) and a tablet have been developed.

Many of such electronic devices comprise a high-speed bus interface. Universal Serial Bus (USB) is one of the most popular high-speed bus interfaces. USB enables data exchange between a host and a USB device.

The wireless technology of these days is evolutionarily developing and therefore there is a demand for achieving a new technology for enabling the wireless technology applicable to USB. This new technology enables data transfer between a host and a USB device without connecting the host and USB device to each other with a cable.

A host, in response to a change in load capacity of a transmission line, which is caused by electrical connection of the USB device to a port, detects the connection of the USB device.

However, in the system configuration which wirelessly connects a host and USB devices, there are some situations where a change in the load capacity of a transmission line cannot be notified to the host. In this case, the host is unable to detect the presence of accessible USB devices.

Under these circumstances, there is a demand for realization of a new function to enable a host to detect a USB device.

Furthermore, in realization of this new function, such measures need to be taken as to not create problems such as misdetection of a USB device, etc.

BRIEF DESCRIPTION OF THE DRAWING

A general architecture that implements the various features of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, an electronic device comprises a Universal Serial Bus (USB) host controller, a wireless transceiver, a detector, a controller and a processor.

The wireless transceiver is connected to the USB host controller via a USB bus. The wireless transceiver is configured to wirelessly transmit a signal obtained by modulating a USB signal from the USB host controller. The wireless transceiver is configured to wirelessly receive a signal from a USB device and send the USB signal obtained by demodulating the wirelessly received signal to the USB host controller.

The detector is configured to detect whether the USB device exists in a communication range of the wireless transceiver. When detected that the USB device exists in the communication range of the wireless transceiver, the controller connects a load for changing the load capacity of the USB bus to the USB bus for the USB host controller to detect the USB device. When the USB host controller enters the compliance mode defined by the USB standard after connecting a load to the USB bus, the processor executes a process for directing the USB host controller to issue Warm Reset defined by the USB standard for the USB host controller to exit the compliance mode.

First, the structure of the electronic device of the embodiment will now be described with reference to FIG. 1. This electronic device can be realized as a notebook portable personal computer (PC), a tablet terminal or various other types of electronic equipments. The following description is based on the assumption that this electronic device is realized as a notebook portable personal computer (PC) 10.

Figure 1:
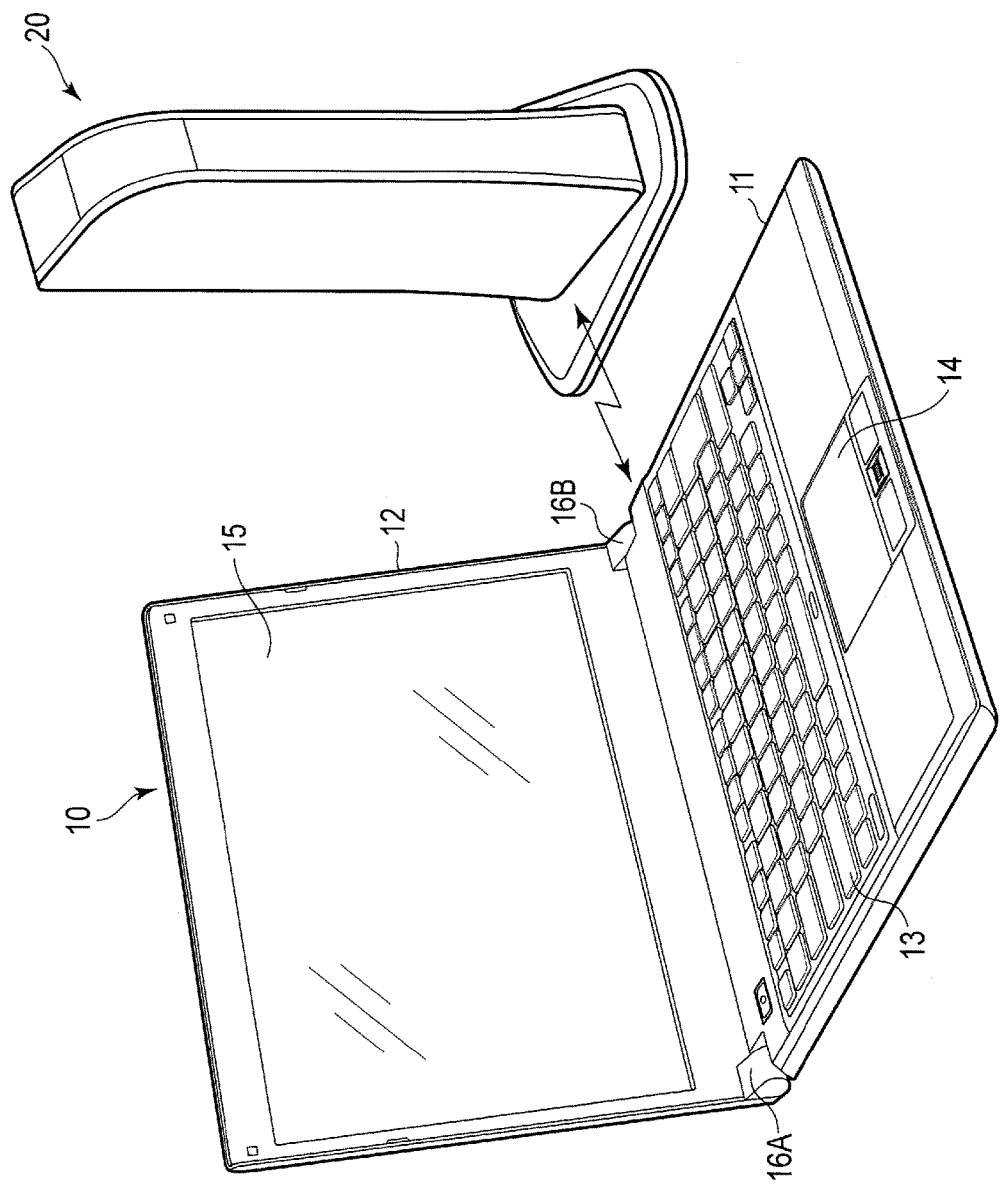
FIG. 1 is an exemplary perspective view of an appearance of an electronic device according to an embodiment.

FIG. 1 is a perspective front-side view of the computer 10 when the display unit is opened. The computer 10 comprises a computer main body 11 and a display unit 12. The display unit 12 accommodates a display device such as a liquid crystal display (LCD) 15 built thereinto.

The display unit 12 is attached to the computer main body 11 such as to be rotatable between an open position where a top face of the computer main body 11 is exposed and a close position where the top face of the computer main body 11 is covered by the display unit 12. A lower end of the display unit 12 is connected with a rear end of the computer main body 11 through rotatable hinges 16A and 16B.

The computer main body 11 comprises a thin-box type housing, and a keyboard 13 and a touchpad (pointing device) 14 are disposed on the top face.

The computer 10 has a wireless interconnect function for performing high-speed data exchange between the computer 10 and the Universal Serial Bus (USB) device 20. The wireless interconnect function is realized using a USB interface conforming to the USB 3.0 standard, and wireless communication technology. Near-field wireless communication can be used for this wireless communication technology. As the near-field wireless communication, a type which utilizes analog modulation can be used. The communication range of the neat-field wireless communication is about several centimeters. When the computer 10 and the USB device 20 are located close to each other within the communication range, the wireless communications can be established between the computer 10 and the USB device 20.

The USB device 20 is a device (peripheral device) conforming to the USB 3.0 standard. This USB device 20 has a wireless interconnect function similar to that of the computer 10. Examples of the USB device 20 are a wireless storage, a wireless docking station and other various wireless peripheral devices.

FIG. 1 shows an exemplified case where the USB device 20 is a wireless docking station. A wireless docking station is an extension device for extending the function of the computer 10. The housing of a wireless docking station may comprise several ports for wired connection to peripheral devices, for example, a USB 3.0 port, a USB 2.0 port, a network port, a High-Definition Multimedia Interface (HDMI) output port, and a DVI port.

The wireless interconnect function of the computer 10 has the following features.

The major components of the wireless interconnect function include a USB host controller and a wireless transceiver. The computer 10 communicates with USB device 20 using the USB host controller and wireless transceiver.

The USB host controller is a host controller conforming to the USB 3.0 standard. The wireless transceiver is connected to the USB host controller through a USB bus. A USB signal from the USB host controller is wirelessly transmitted to the USB device 20 by the wireless transceiver. The wireless transceiver wirelessly receives the signal from the USB device 20. The received signal is sent to the USB host controller as a USB signal. Thus, the wireless transceiver functions as a wireless USB port.

The wireless interconnect function includes a dummy load generation function. The dummy load generation function is a function of reproducing a change in the load capacity of the USB bus produced when the USB device 20 is connected by wire to a USB bus. When it is detected that the USB device 20 is located in the communication range of the wireless transceiver, the dummy load generation function connects a load (dummy load) for changing the load capacity of a USB bus to the USB bus. With the dummy load generation function, it is possible to cause the USB host controller to detect an accessible USB device (USB device 20).

In other words, the dummy load generation function can change the electrical characteristics (load capacity) of a USB bus as if the USB device 20 is connected by cable to the USB bus. The USB host controller, in response to the change in electrical characteristics (load capacity) of the USB bus, detects connection of the USB device 20 to the USB bus. Then, the USB host controller starts the connection sequence for establishing connection between the USB device 20 and the USB host controller.

However, if a load (dummy load) is connected to a USB bus by erroneous detection of a USB device 20, the connection sequence may be started though an accessible USB device is not actually present. In this case, since the USB host controller cannot establish connection between the USB device 20 and the USB host controller, the USB host controller enters the compliance mode defined by the USB standard (USB 3.0, USB 3.1, or the like). The compliance mode is a mode utilized to test the signal transmission function of a USB host controller. In the compliance mode, the USB host controller repeats transmission of several test patterns. While the USB host controller is in the compliance mode, a wireless USB port is not applicable to communication with the USB device 20. Such a situation may be created not only when the presence of a USB device 20 is erroneously detected, but also when the computer 10 and the USB device 20 are once placed close to each other, but they are separated a distance apart immediately thereafter.

In order to avoid this, when a USB host controller enters the compliance mode after connection of a dummy load, the wireless interconnect function automatically directs the USB host controller to issue a Warm Reset defined by the USB standard (USB 3.0, USB 3.1, or the like) for the USB host controller to exit the compliance mode. In this way, the state of the USB host controller can be recovered from the compliance mode to the initial state which can detect connection of a USB device 20.

Figure 2:
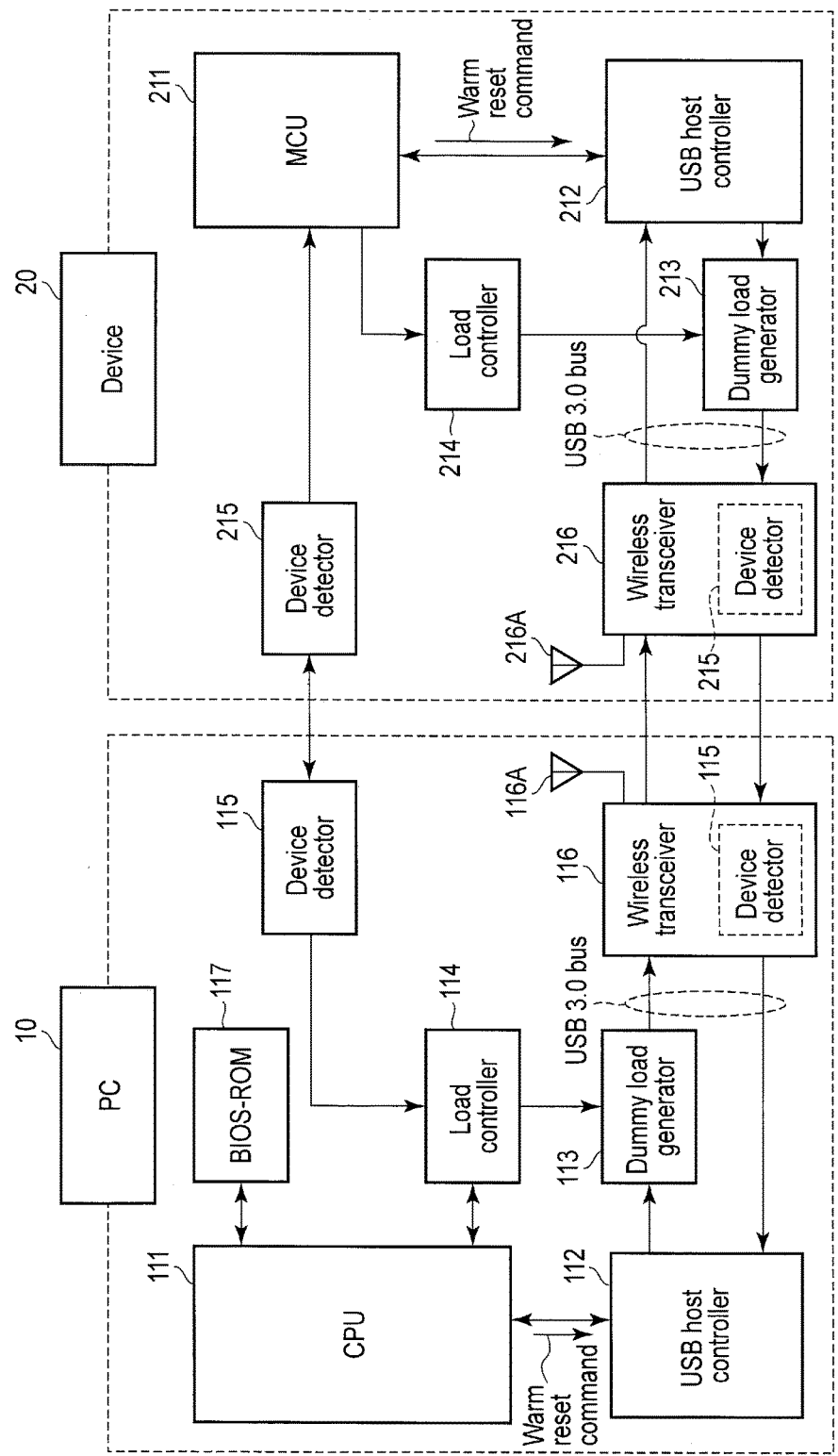
FIG. 2 is an exemplary block diagram illustrating a system configuration of the electronic device of the embodiment, and a system configuration of a USB device.

FIG. 2 shows a system configuration of the computer 10 and a system configuration of the USB device 20.

The computer 10 comprises a CPU 111, a USB host controller 112, a dummy load generator 113, a load controller 114, a device detector 115, a wireless transceiver 116, a BIOS-ROM 117 and the like.

The USB device 20 comprises a microcontroller unit (MCU) 211, a USB host controller 212, a dummy load generator 213, a load controller 214, a device detector 215, a wireless transceiver 216 and the like.

The USB host controller 112 functions as a host controller conforming to USB 3.0 standard. The USB host controller 112 executes communication with the USB device 20 through a USB bus (USB 3.0 bus).

When the USB device 20 is located close thereto, the computer 10, utilizing the dummy load generator 113, operates the USB host controller 112 to detect connection of a USB device 20. If the USB host controller 112 enters the compliance mode without establishing connection between the USB host controller 112 and the USB device 20, the CPU (processor) 111 executes processing for directing the USB host controller 112 to issue a Warm Reset under control of the basic input/output system (BIOS) stored in the BIOS-ROM 117.

The wireless transceiver 116 is connected to the USB host controller 112 through a USB 3.0 bus. The wireless transceiver 116 is configured to execute the above-described near-field wireless communications. The wireless transceiver 116 converts a digital USB signal from the USB host controller 112 into an analog signal. Then, the wireless transceiver 116 wirelessly transmits a signal obtained by modulating the analog signal through an antenna 116A. Further, the wireless transceiver 116 wirelessly receives a signal from the USB device 20 through the antenna 116A. Then, the wireless transceiver 116 converts an analog signal obtained by demodulating the wirelessly received signal, into a digital signal. This digital signal is sent to the USB host controller 112 as a USB signal from the USB device 20.

The wireless transceiver 216 of the USB device 20 is configured to execute a function similar to that of the wireless transceiver 116.

The dummy load generator 113 has a function of imitating the change in the electrical characteristics (load capacity) of a USB 3.0 bus that occur when a USB device is connected by wire to the USB 3.0 bus. In other words, the dummy load generator 113 comprises, for example, a switch, resistance and a capacitor, and carries out connection of a load (dummy load) to a USB 3.0 bus and detachment of the load from the USB 3.0 bus.

The dummy load generator 213 of the USB device 20 is configured to execute a function similar to that of the dummy load generator 113.

The device detector 115 detects whether a USB device 20 is present in the communication range of the wireless transceiver 116. As described above, the communication range is several centimeters. For this reason, the device detector 115 may utilize, for example, a magnetic sensor, a photo sensor or the like to detect the presence/absence of a USB device 20 in a communication range.

Near-field wireless communication between the computer 10 and the USB device 20 may be executed while the housing of the computer 10 and that of the USB device 20 are physically in contact. In this case, the device detector 115 may be a mechanical switch configured to detect whether the housing of the computer 10 and that of the USB device 20 are physically in contact.

Or, the function of the device detector 115 may be executed by the wireless transceiver 116. The device detector 115 in the wireless transceiver 116 may be configured to detect that a USB device 20 is present in a communication range, for example, according to the result of the negotiation of wireless communications.

The device detector 215 of the USB device 20 is also configured to execute a function similar to that of the device detector 115.

The load controller 114 executes ON/OFF control of the dummy load generator 113 according to the detection result of the USB device 20 by the device detector 115. More specifically, when detected that a USB device 20 is present in the communication range, the load controller 114 turns on the dummy load generator 113. On the other hand, when detected that a USB device 20 is not present in the communication range, the load controller 114 turns off the dummy load generator 113.

In the ordinary PC architecture, an embedded controller configured to execute power control is provided. The function of the load controller 114 may be executed by this embedded controller. The embedded controller includes a general-purpose I/O (GPIO) port. The embedded controller can supply a control signal for turning on or off the dummy load generator 113 to the dummy load generator 113 through the GPIO port.

The load controller 214 of the USB device 20 is also configured to execute a function similar to that of the load controller 114. In the USB device 20, the MCU 211 may control operation of the load controller 214 according to the result of device detection.

As described above, the CPU 111 executes processing for directing the USB host controller 112 to issue a Warm Reset under control of the BIOS. More specifically, the BIOS detects that the USB host controller 112 has entered the compliance mode of USB 3.0 after the USB device 20 is detected by the device detector 115 (that is, after the dummy load generator 113 is turned on). In response to this detection, the CPU 111 sends a Warm Reset command to the USB host controller 112 under control of the BIOS and thus directs the USB host controller 112 to issue a Warm Reset. When directed to issue a Warm Reset, the USB host controller 112 exits from the compliance mode to Rx. Detect of USB 3.0. Rx. Detect is an initial state in which connection of a USB device 20 can be detected.

The MCU 211 of the USB device 20 has a function of issuing a Warm Reset command as a function of the BIOS.

Figure 3:
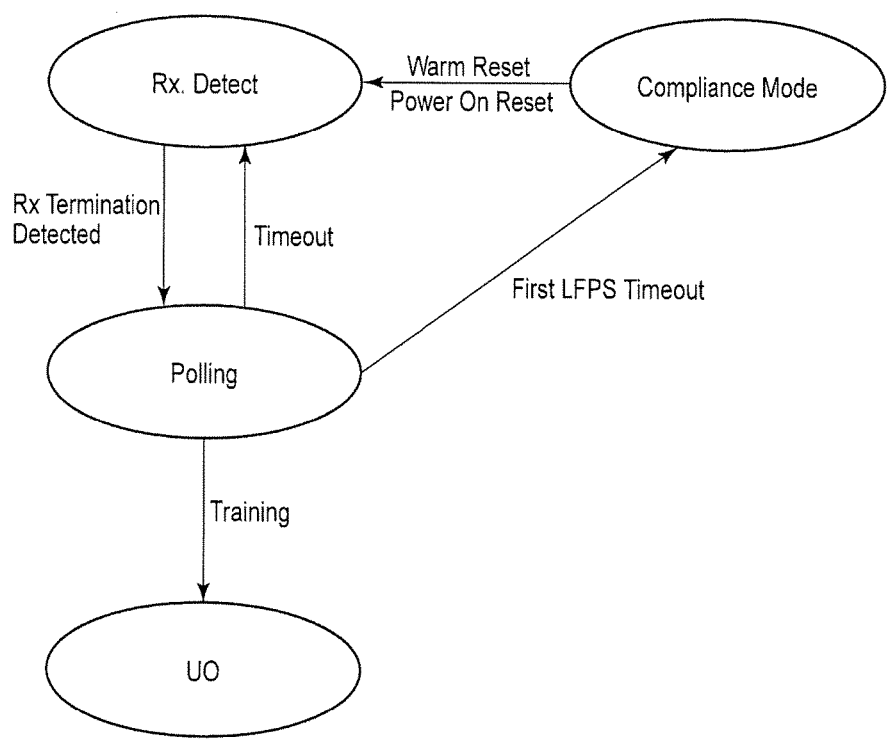
FIG. 3 is an exemplary state diagram illustrating some typical states of a USB host controller in the electronic device of the embodiment.

FIG. 3 shows several typical states of the USB host controller 112.

The USB host controller 112 transitions between several states such as Rx. Detect, Polling, U0 and a compliance mode as shown in FIG. 3. Rx. Detect is an initial state in which connection of a USB device 20 can be detected, as described above. In Rx. Detect, the USB host controller 112 periodically transmits a pulse signal, for example. If, here, a USB device 20 is connected by wire to a USB 3.0 bus, the electrical characteristics (load capacity) of the USB 3.0 bus are varied by this connection (that is, by termination of the USB device 20). As a result, the waveform of the pulse signal output to the USB 3.0 bus from the USB host controller 112 changes. The USB host controller 112 detects the change in the waveform of the pulse signal, that is, the delay in rise of the pulse signal. In response to the detection of the change in the waveform of the pulse signal, the USB host controller 112 detects that the USB device 20 has been connected (Rx Termination Detected). Polling is a state for link training. In the state of Polling, the USB host controller 112 transmits a polling signal to the USB device 20.

When the link training is completed, connection between the USB host controller 112 and the USB device 20 is established. Then, the USB host controller 112 enters U0. U0 is a normal operating state in which a packet is transmitted and received between the USB host controller 112 and the USB device 20.

On the other hand, when the time corresponding to a timeout elapses without receiving the same polling signal as that transmitted by the USB host controller 112 from the USB device 20 (First LFPS Timeout), the USB host controller 112 enters the compliance mode. As described above, the Compliance mode is a mode used to test the transmission function of the USB host controller 112. While the USB host controller 112 is in the compliance mode, the USB host controller 112 continuously transmits several test patterns. Therefore, the wireless USB ports cannot be used for the usual data exchange.

Only when a power-on reset occurs, or issue of Warm Reset is directed, the USB host controller 112 transitions to Rx. Detect from the compliance mode.

Figure 4:
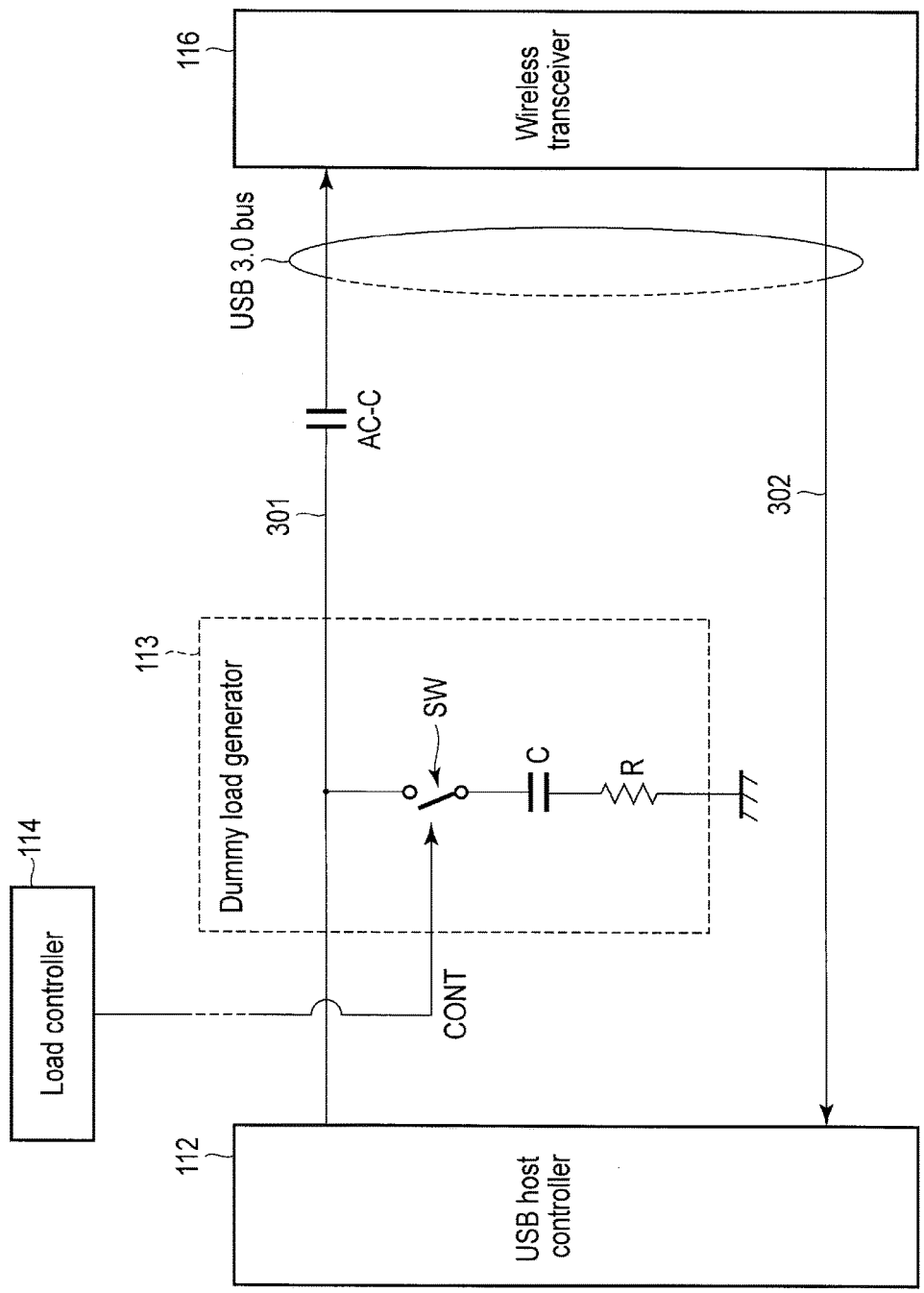
FIG. 4 is an exemplary circuit diagram showing a structure of a dummy load generator in the electronic device of the embodiment.

FIG. 4 shows the structure of the dummy load generator 113.

The USB 3.0 bus includes a differential link 301 for data transmission and a differential link 302 for data reception. The differential links 301 and 302 are used for super-speed data transfer. A capacitor AC-C for AC coupling is inserted in the differential link 301 for data transmission. The dummy load generator 113 connects a load (load capacity) to the differential link 301.

The dummy load generator 113 may include a switch SW, a capacitor C and a resistance R. The switch SW is turned on or turned off by a control signal CONT from the load controller 114.

Figure 5:
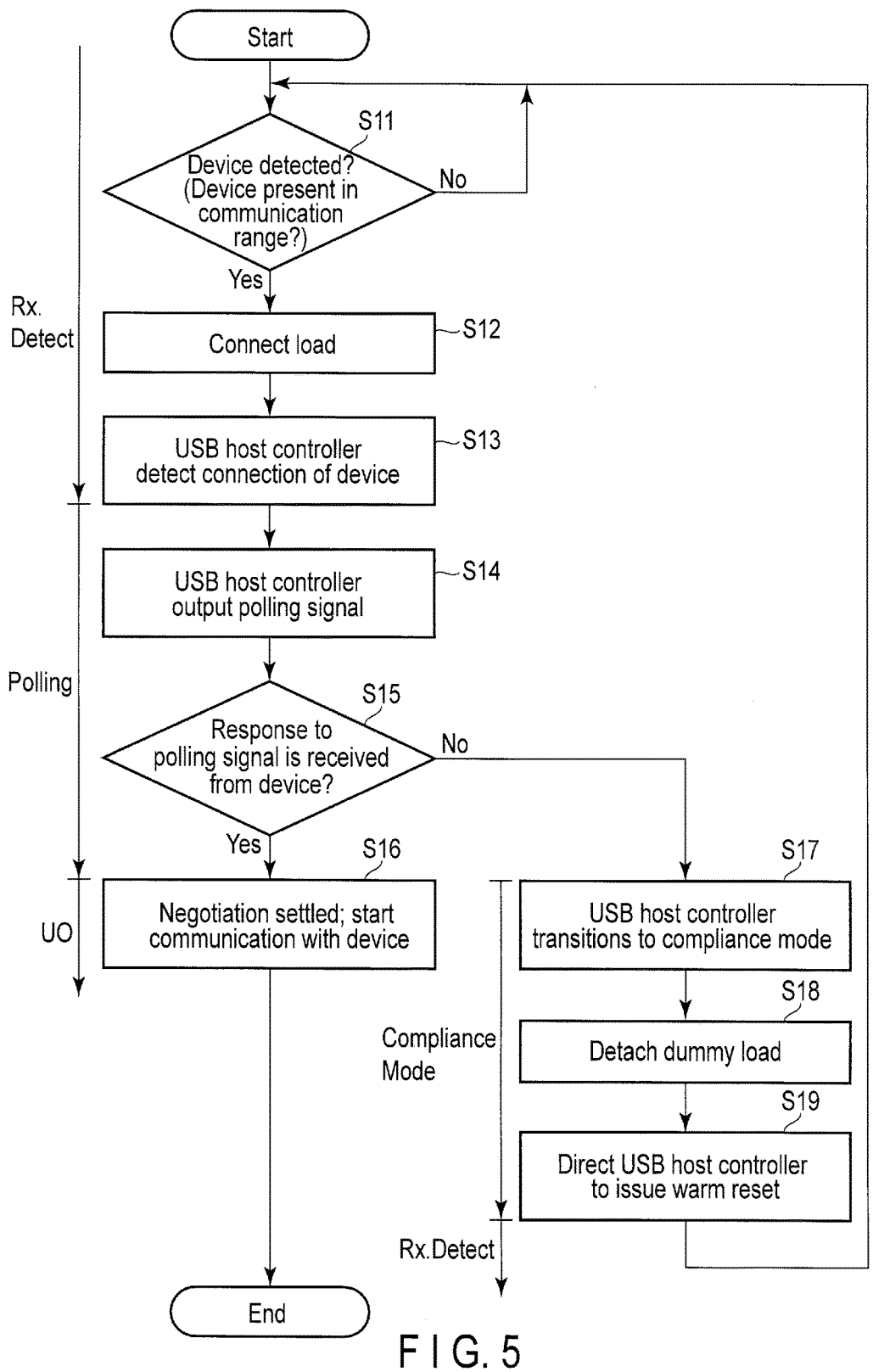
FIG. 5 is an exemplary flowchart illustrating a connection process executed by the electronic device of the embodiment.

The flowchart of FIG. 5 illustrates the procedure of the connection processing executed by the computer 10.

The device detector 115 detects whether a USB device 20 is present in the communication range of the wireless transceiver 116 (step S11). If a USB device 20 is not present in the communication range of the wireless transceiver 116, that is, if the computer 10 and the USB device 20 are not close to each other (NO in step S11), the device detector 115 will wait for the computer 10 and the USB device 20 to become close.

When detected that a USB device 20 is located in the communication range of the wireless transceiver 116 (YES in Step S11), the device detector 115 notifies the load controller 114 of the presence of the USB device 20. The load controller 114 connects a load (dummy load) to the USB 3.0 bus by turning on the dummy load generator 113 (step S12). Thus, the load capacity of the USB 3.0 bus is changed.

Here, the state of the USB host controller 112 is Rx. Detect. In response to the change in the load capacity of the USB 3.0 bus, the USB host controller 112 detects that the USB device 20 has been connected to the USB 3.0 bus (Step S13).

The USB host controller 112 transitions from Detect to Polling to start the connection sequence. The USB host controller 112 transmits a polling signal through the USB 3.0 bus (step S14). The USB host controller 112 detects whether the same polling signal as this polling signal is received from the USB device 20 (step S15). When detected that the same polling signal is received from the USB device 20 (YES in step S15), the negotiation of the USB 3.0 is settled and the USB host controller 112 enters U0 (step S16).

On the other hand, if the same polling signal is not received from the USB device 20 (NO in Step S15), the USB host controller 112 enters the compliance mode (step S17).

The BIOS can determine whether the presence of the USB device 20 has been detected from the value of the register in the load controller 114 (EC), for example. Further, the BIOS can determine whether the USB host controller 112 is in the compliance mode from the value of the register in the CPU 111, for example.

When the USB host controller 112 entered the compliance mode in the state where the presence of a USB device 20 was detected, the BIOS controls the load controller 114 to detach the load (dummy load) from the USB 3.0 bus (step S18). Then, the BIOS makes CPU 111 execute processing for transmitting a Warm Reset command by the USB host controller 112, and thus direct the USB host controller 112 to issue a Warm Reset (step S19). As a result, the USB host controller 112 exits the compliance mode and returns to Rx. Detect.

As described, even if a dummy load was turned on due to misdetection or the like of a USB device 20 and thus the USB host controller 112 enters the compliance mode, a wireless USB port can be restored to a usable state without rebooting the computer 10. Further, the USB host controller 112 is directed to issue a Warm Reset after the load (dummy load) is detached from the USB 3.0 bus. With this configuration, it is possible to prevent a numerously repetitious loop in which the USB host controller 112 enters compliance mode and returns to Rx. Detect.

As explained above, according to the embodiment, when detected that a USB device 20 is present in the communication range of the wireless transceiver 116, a load (dummy load) is connected to the USB 3.0 bus, which makes it possible for the USB host controller 112 to detect the USB device 20.

Further, when the USB host controller 112 enters the compliance mode defined by the USB standard after connection of dummy load, the USB host controller 112 is automatically directed to issue a Warm Reset defined by the USB standard. With this configuration, even if a dummy load was turned on due to misdetection or the like of a USB device 20 and thus the USB host controller 112 enters the compliance mode, a wireless USB port can be restored to a usable state without rebooting the computer 10.

Note that the embodiment is explained in connection with the case where the function of automatically transmitting a Warm Reset command to the USB host controller 112 is autonomously executed by the BIOS. But this function may be executed by an operating system, software, or a USB driver. Or this function may be executed in response to a manual action such as the pushing of a specific button by the user.

Moreover, each of the various functions described in this embodiment may be realized by means of circuitry (processing circuitry). Examples of the processing circuitry include a programmed processor such as a central processing unit (CPU). This processor executes each of the described functions by executing the computer program (command group) stored in the memory. This processor may be a microprocessor including an electronic circuit. Examples of the processing circuitry include a digital-signal processor (DSP), an application-specific integrated circuit (ASIC), a microcontroller, a controller and other electronic circuit components. Each of the other components other than the CPU described in this embodiment may also be realized by processing circuitry.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a Universal Serial Bus (USB) host controller;
a wireless transceiver connected to the USB host controller through a USB bus and configured to wirelessly transmit a signal obtained by modulating a USB signal from the USB host controller, wirelessly receive a signal from a USB device, and send a USB signal obtained by demodulating the wirelessly received signal to the USB host controller;
a detector configured to detect whether the USB device is present in a communication range of the wireless transceiver;
a controller configured to connect a load for changing a load capacity of the USB bus to the USB bus for the USB host controller to detect the USB device when detected that the USB device is present in the communication range of the wireless transceiver; and
a processor configured to execute, when the USB host controller enters a compliance mode defined by the USB standard after connecting the load to the USB bus, a process for directing the USB host controller to issue a Warm Reset defined by the USB standard for the USB host controller to exit the compliance mode.

2. The electronic device of claim 1, wherein the processor is configured to execute, when the USB host controller enters the compliance mode after connecting the load to the USB bus, a process for detaching the load from the USB bus and a process for directing the USB host controller to issue the Warm Reset after detaching the load.

3. The electronic device of claim 1, wherein the processor is configured to execute a process for directing the USB host controller to issue the Warm Reset when both of a first condition that the USB device is detected to be present in the communication range of the wireless transceiver and a second condition that the USB host controller enters the compliance mode are satisfied.

4. The electronic device of claim 1, wherein the load is connected to the USB bus via a switch, and the controller is configured to turn on the switch when detected that the USB device is present in the communication range of the wireless transceiver.

5. The electronic device of claim 1, wherein
the USB bus comprises a differential link for data transmission and a differential link for data reception, and
the load is connected to the differential link for data transmission.

6. The electronic device of claim 1, wherein
the USB bus comprises a differential link for data transmission and a differential link for data reception,
the load is connected via a switch to the differential link for data transmission switch, and
the controller is configured to turn on the switch when detected that the USB device is present in the communication range of the wireless transceiver.

7. The electronic device of claim 1, wherein the wireless transceiver is configured to: (1) convert the USB signal from the USB host controller into an analog signal from a digital signal; (2) wirelessly transmit a signal obtained by modulating the analog signal; (3) wirelessly receive the signal from the USB device, and convert a signal obtained by demodulating the wirelessly received signal into a digital signal from an analog signal, the digital signal being sent the USB host controller as a USB signal from the USB device.

8. A method executed by an electronic device, the electronic device comprising: a Universal Serial Bus (USB) host controller; and a wireless transceiver connected to the USB host controller through a USB bus and configured to wirelessly transmit a signal obtained by modulating a USB signal from the USB host controller, wirelessly receive a signal from a USB device, and send a USB signal obtained by demodulating the wirelessly received signal to the USB host controller;
the method comprising:
detecting whether the USB device is present in a communication range of the wireless transceiver;
connecting a load for changing a load capacity of the USB bus to the USB bus for the USB host controller to detect the USB device when detected that the USB device is present in the communication range of the wireless transceiver; and
directing, when the USB host controller enters a compliance mode defined by the USB standard after connecting the load to the USB bus, the USB host controller to issue a Warm Reset defined by the USB standard for the USB host controller to exit the compliance mode.

9. The method of claim 8, further comprising:
detaching the load to the USB bus when the USB host controller enters the compliance mode after connecting the load to the USB bus,
wherein the directing to issue the Warm Reset is executed after the detaching the load from the USB bus.

10. The method of claim 8, wherein
the directing to issue the Warm Reset is executed when both of a first condition that the USB device is detected to be present in the communication range of the wireless transceiver and a second condition that the USB host controller enters the compliance mode are satisfied.

11. The method of claim 8, wherein
the load is connected to the USB bus via a switch, and
the connecting the load to the USB bus comprises turning on the switch.

12. The method of claim 8, wherein
the USB bus comprises a differential link for data transmission and a differential link for data reception, and
the load is connected to the differential link for data transmission.

13. The method of claim 8, wherein
the USB bus comprises a differential link for data transmission and a differential link for data reception,
the load is connected via a switch to the differential link for data transmission, and
the connecting the load to the USB bus comprises turning on the switch.

* * * * *